US012448039B2

(12) United States Patent
Mueller et al.

(10) Patent No.: US 12,448,039 B2
(45) Date of Patent: Oct. 21, 2025

(54) ELECTROMECHANICAL DUAL STEERING SYSTEM FOR A UTILITY VEHICLE

(71) Applicant: KNORR-BREMSE Systeme fuer Nutzfahrzeuge GmbH, Munich (DE)

(72) Inventors: Jens-Hauke Mueller, Velbert-Neviges (DE); Alexander Kogan, Cologne (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 664 days.

(21) Appl. No.: 17/797,963

(22) PCT Filed: Jan. 28, 2021

(86) PCT No.: PCT/EP2021/051954
§ 371 (c)(1),
(2) Date: Aug. 5, 2022

(87) PCT Pub. No.: WO2021/156132
PCT Pub. Date: Aug. 12, 2021

(65) Prior Publication Data
US 2023/0043320 A1     Feb. 9, 2023

(30) Foreign Application Priority Data
Feb. 7, 2020    (DE) .................... 10 2020 103 150.5

(51) Int. Cl.
*B62D 7/14*    (2006.01)
*B62D 5/04*    (2006.01)

(52) U.S. Cl.
CPC ........... *B62D 7/148* (2013.01); *B62D 5/0421* (2013.01); *B62D 5/0445* (2013.01); *B62D 5/0484* (2013.01); *B62D 7/142* (2013.01)

(58) Field of Classification Search
CPC .... B62D 7/148; B62D 5/0421; B62D 5/0445; B62D 5/0484; B62D 7/142
See application file for complete search history.

(56) References Cited

U.S. PATENT DOCUMENTS 8,069,945 B2 * 12/2011 Sherwin ................ B62D 6/002
180/413
9,238,481 B2 *  1/2016 Johnson ............... B62D 7/1563
(Continued)

FOREIGN PATENT DOCUMENTS

CN      103552606 A      2/2014
DE        3833306 A *    4/1989 ............... B62D 5/04
(Continued)

OTHER PUBLICATIONS

Japanese-language Office Action issued in Japanese Application No. 2022-547975 dated Aug. 15, 2023 with English translation (14 pages).
(Continued)

*Primary Examiner* — Jacob D Knutson
(74) *Attorney, Agent, or Firm* — Crowell & Moring LLP

(57) ABSTRACT

An electromechanical dual steering system for a utility vehicle includes two steering systems, each having a drive unit for actuating one steering linkage each for wheels of the utility vehicle. Each drive unit has an electric motor. The dual steering system has a main power supply for supplying the electric motors with energy. The electromechanical dual steering system is characterized in that the dual steering system has at least one emergency power supply for supplying at least one electric motor with energy in the event that the main power supply fails.

19 Claims, 4 Drawing Sheets

(56) References Cited

U.S. PATENT DOCUMENTS

| | | | |
|---|---|---|---|
| 2009/0312909 A1* | 12/2009 | Onuma | B62D 6/008 |
| | | | 701/41 |
| 2012/0241244 A1 | 9/2012 | Escobedo et al. | |
| 2018/0001926 A1* | 1/2018 | Swieter | B62D 5/046 |
| 2018/0057041 A1* | 3/2018 | Nakajima | B62D 5/0463 |
| 2018/0362073 A1 | 12/2018 | Hirate et al. | |
| 2020/0031295 A1 | 1/2020 | Miller et al. | |

FOREIGN PATENT DOCUMENTS

| | | | |
|---|---|---|---|
| DE | 199 10 001 A1 | 9/2000 | |
| DE | 10 2006 020 487 A1 | 11/2006 | |
| DE | 10 2008 022 606 A1 | 11/2009 | |
| DE | 10 2012 212 608 A1 | 2/2014 | |
| DE | 10 2013 000 898 A1 | 7/2014 | |
| DE | 102017104667 A1 * | 9/2018 | B60R 16/03 |
| DE | 10 2017 108 378 A1 | 10/2018 | |
| EP | 1 877 294 B1 | 8/2010 | |
| EP | 3396326 A1 * | 10/2018 | B60R 16/033 |
| JP | 2003-343682 A | 12/2003 | |
| JP | 2009-96213 A | 5/2009 | |
| JP | 2009-120097 A | 6/2009 | |
| JP | 2010-105457 A | 5/2010 | |
| JP | 2019-1273 A | 1/2019 | |
| WO | WO-2017202565 A1 * | 11/2017 | B62D 3/06 |

OTHER PUBLICATIONS

International Search Report (PCT/ISA/210) issued in PCT Application No. PCT/EP2021/051954 dated May 4, 2021 with English translation (six (6) pages).

Japanese-language Written Opinion (PCT/ISA/237) issued in PCT Application No. PCT/EP2021/051954 dated May 4, 2021 (three (3) pages).

German-language Office Action issued in German Application No. 10 2020 103 150.5 dated Oct. 6, 2020 (8 pages).

Portuguese-language Office Action issued in Brazilian Application No. BR112022014157-2 dated Apr. 15, 2024 with English translation (5 pages).

Chinese-language Office Action issued in Chinese Application No. 202180013445.1 dated Mar. 21, 2023 with English translation (10 pages).

* cited by examiner

ELECTROMECHANICAL DUAL STEERING SYSTEM FOR A UTILITY VEHICLE

BACKGROUND AND SUMMARY

The invention relates to an electromechanical dual-circuit steering system for a utility vehicle and to a utility vehicle.

In order to steer a utility vehicle, use is generally made of hydraulic dual-circuit steering systems. The latter consist of two steering systems for one dedicated steerable axle each, with the driver's steering forces being hydraulically assisted. During normal operation, the two steering systems obtain hydraulic assistance by a hydraulic pump which is driven by the main motor of the vehicle. A redundant design requires an emergency steering pump which is driven depending on the driving and to which a switch is made in the event of a failure of the main motor. At the same time, one of the two steerable axles is separated here from the hydraulic assistance so as not to overload the emergency steering pump. Steerability of the utility vehicle is thus ensured even in the event of failure of the main motor.

The hydraulic system is more complicated in comparison to an electrical steering assistance, and therefore electrically assisted steering systems are used ever more frequently. The driver's steering force is assisted here by an electric motor which, as in US20120241244A1, acts on the actual steerable axle by means of a transmission. Combinations of a hydraulically assisted first steerable axle and an electrically actuated second steerable axle are also known. Such a dual-circuit steering system can be seen, for example, in DE19910001A1. This makes it possible to dispense with hydraulic lines to the second, frequently rear axle of a utility vehicle. Instead, only one cable to the second axle is required.

During autonomous driving, use is also made of steering systems which entirely dispense with a mechanical coupling of driver and steering system and actuate the steering system exclusively via an electric motor. For this purpose, DE102012212608A1 discloses an electric motor with a rotor which is designed as a hollow shaft and which directly drives the steerable axle. The vehicle can thus control the steering system without assistance by the driver, and an autonomous driving mode or independent intervention of the vehicle in the steering system is made possible.

However, if the main power supply fails in an electrically assisted or purely electrically operated steering system, steering of the vehicle is made difficult, without power assistance, or is even no longer possible.

On the basis of this prior art, it is the object of the invention to protect operation of an electromechanical dual-circuit steering system for utility vehicles more effectively against failure.

It is essential for the invention that, in the event of a failure of the main power supply, an emergency power supply becomes active and supplies at least one of the steering systems with electrical energy such that safe steering of the utility vehicle remains possible. This connects the advantages of a redundantly designed hydraulic dual-circuit steering system with those of a less complicated and lower-maintenance electromechanical dual-circuit steering system.

The electromechanical dual-circuit steering system according to the invention is for a utility vehicle and comprises two steering systems which each have a drive unit for actuating a respective steering linkage for wheels of the utility vehicle. The two steering systems are preferably attached to two different axles of the utility vehicle. The driving performance of the utility vehicle is thereby improved and the turning circle becomes smaller. The steering linkage of the wheels can act, for example, on the wheel hub of the respective wheel and can thus rotate the wheels about an axis of rotation such that steering of the vehicle is made possible. The wheels of the first axle can be rotated in the same direction as the wheels of the second axle, and therefore an improved driving performance at higher speeds is obtained. However, the wheels of the two axles can also be rotated in an opposed manner such that a smaller turning circle is achieved at low speeds.

According to the invention, each drive unit of the steering systems comprises a respective electric motor. Furthermore, the dual-circuit steering system according to the invention comprises a main power supply for supplying the electric motors with electrical energy. The electric motors can actuate a steering shaft of the steering system. The electric motors can engage here directly on a steering shaft or can be connected thereto by means of a transmission. Other couplings are likewise conceivable. The electric motor can pivot the steering shaft, with the pivoting movement then being converted by a steering gear of the steering system into a translational movement of a steering rod of the steering linkage. The steering linkage of the wheels is thereby actuated.

The electromechanical dual-circuit steering system is characterized in that the dual-circuit steering system has at least one emergency power supply for supplying at least one electric motor with energy in the event of a failure of the main power supply. Should the main power supply of the utility vehicle fail, the emergency power supply is capable of maintaining the steerability of the utility vehicle by the emergency power supply supplying the electric motor or the electric motors of the steering systems with electrical energy. The vehicle can thus be brought, for example, safely to a standstill or, depending on the design of the emergency power supply, can continue to be operated without disturbance.

It can be advantageous not to supply all of the electric motors with power, so that the emergency power supply is not overstressed. For example, one steering system can be made rigid and only the other steering system used for steering the utility vehicle. A preferred embodiment of the dual-circuit steering system is therefore characterized in that the emergency power supply is designed to supply precisely one electric motor with energy.

However, both steering systems may also be supplied with electrical energy if the emergency power supply permits this. A further preferred embodiment of the dual-circuit steering system therefore makes provision for the dual-circuit steering system to have an emergency power supply for supplying all of the electric motors with energy in the event of a failure of the main power supply. In order to keep the system of the emergency power supply as simple as possible and not to have to design all of the components in duplicate form, it can be of advantage to construct an emergency power supply which supplies all of the electric motors of the steering systems with electrical energy. Thus only cable connections from the emergency power supply to the respective electric motor have to be laid. Individual peripherals for each individual steering system can be omitted.

According to a preferred embodiment of the dual-circuit steering system according to the invention, said dual-circuit steering system is therefore characterized in that the dual-circuit steering system comprises one substantially independent emergency power supply per electric motor. In this variant, a dedicated emergency power supply is provided for each steering system. This affords the advantage that, in the event of a failure of the main power supply, all of the advantages of the dual-circuit steering system, such as the improved driving performance are maintained. In addition, it affords the advantage that the utility vehicle still remains steerable even in the event of a failure of one emergency power supply.

A further preferred embodiment of the dual-circuit steering system according to the invention is characterized in that the emergency power supply has a generator which is designed to be driven by rolling of the utility vehicle and to supply at least one of the electric motors with energy. This variant provides an additional generator which is coupled, for example, to a drive shaft of the utility vehicle such that said generator rotates as soon as the utility vehicle rolls, irrespective of whether the motor of the utility vehicle is turning. The supply with electrical energy during the driving mode can thus be ensured even when the motor is at a standstill. When stationary, by combining with a buffer store, the temporary supply of the steering system with electrical energy could likewise be ensured, and therefore, even when stationary, steering assistance or steering is possible, which will be described in more detail below.

According to a further preferred embodiment of the dual-circuit steering system according to the invention, said dual-circuit steering system is characterized in that the emergency power supply has an energy store for supplying the electric motor. It is furthermore preferred for the emergency power supply to be designed to keep the energy store charged. Said energy store is preferably a capacitor. The capacitor here forms the energy source for the operation of the steering system in the emergency mode. Depending on the size of the capacitor, the operation of the steering system for a short period of time can be provided for immediately safely stopping the utility vehicle, or else, in the event of a greater capacitor, can supply the steering system with power for a longer period of time, for example in order to steer the utility vehicle from a road to a secure parking location. In order for a change to be able to be made immediately to the emergency power supply, the capacitor has to be kept charged.

A preferred embodiment of the dual-circuit steering system according to the invention is characterized in that the emergency power supply is designed to charge up the energy store in the event of a failure of the main power supply, by a recuperation of restoring forces from the steering linkage. If the wheels of a utility vehicle are deflected in the driving mode, a restoring force prevails which will attempt to force the wheels again in the direction of the central position. This restoring force can be used by means of recuperation. In order to actuate the steering linkage, the electric motor has to turn. If the restoring forces of the steering system turn the steering shaft back, the electric motor is inevitably turned at the same time and, in the generator mode, can again generate electrical energy. This electrical energy can then be used to charge up the capacitor. It is therefore preferred that the electric motor is designed to charge up the energy store in a generator mode upon rotation by the restoring forces. This permits either an extension of the possible emergency power mode, or else can be used to design the capacitor to be smaller with less capacity in order to make the costs lower. In addition, a capacitor can be charged up rapidly by means of its very high currents, and therefore it is readily suitable for receiving energy from the recuperation.

According to a preferred embodiment of the dual-circuit steering system according to the invention, said dual-circuit steering system is characterized in that the energy store has a rechargeable battery. If, according to the above-described variant, a generator is provided, the energy store and in particular the rechargeable battery can serve as an intermediate store for the generator for supplying the electric motor with energy. The steering system is thereby supplied with energy.

A higher capacity of the energy store is possibly necessary for supplying the steering system. A rechargeable battery is preferably a lithium-ion, lithium-polymer, lead- or nickel-metal hydride rechargeable battery. Such rechargeable batteries have significantly higher capacities than the capacitor and can thus ensure the emergency power supply for longer.

According to a further preferred embodiment of the dual-circuit steering system according to the invention, said dual-circuit steering system is characterized in that each steering system has a dedicated, substantially closed steering housing, and the emergency power supply and the respective drive unit are arranged in at least one steering housing of the steering systems. By means of this design, the steering gear remains substantially as a unit, and therefore no further, larger module of the steering system arises. It is not ruled out that, however, individual components of the steering system or of the emergency power supply are located outside the steering housing. The energy store and in particular the capacitor is preferably arranged in the steering housing. The generator is preferably arranged outside the steering housing, for example is arranged on the drive shaft of the utility vehicle.

A further preferred embodiment of the dual-circuit steering system according to the invention is characterized in that the force for actuating the steering linkage originates solely from the respective electric motor. If the vehicle is intended to be capable of, for example, driving autonomously or independently undertaking steering interventions, the steering system should be capable not only of boosting the driver's steering forces, but, moreover, of using solely its own force to actuate the steering system. In such a case, the force for actuating the steering linkage can therefore originate solely from an electric motor.

According to a preferred embodiment of the dual-circuit steering system according to the invention, said dual-circuit steering system is characterized in that the dual-circuit steering system comprises a data interface for activating the electric motor by a highly autonomous driving control system for driverless operation of the utility vehicle. Such a highly autonomous driving control system is also referred to as a highly autonomous driving system. For a driverless driving mode, diverse sensors are required on the steering wheel and steering system in order to detect and to control the current state of the steering system. For this purpose, a data interface is required on the steering system, the data interface processing, for example, steering angles, steering forces, motor parameters, control commands or similar data. A highly autonomous driving system can thus access the steering system, and read and control the latter.

According to a further preferred embodiment of the dual-circuit steering system according to the invention, said dual-circuit steering system is characterized in that the dual-circuit steering system has a sensor which is arranged on a direction-selecting element of the utility vehicle and which detects a desired steering angle and transmits same to a motor control module of the dual-circuit steering system, which motor control module, on the basis of the detected desired steering angle, activates the electric motor. A direction-selecting element of a vehicle, for example a steering wheel, can detect the current position by means of sensors and therefore the desired steering angle by means of one or more sensors and transmit same to a motor control module of the steering system. The control module can thus convert said desired steering angle into a motor control signal and correspondingly actuate the steering system. In this way, there does not necessarily have to be a mechanical connection between the direction-selecting element of a utility vehicle and the actual steering system of the utility vehicle. The desired steering angle is preferably compared with an actual steering angle. This improves the control and regulation of the electric motor of the steering system and leads to greater driving comfort and increased safety.

A preferred embodiment of the dual-circuit steering system according to the invention is characterized in that the respective electric motor for actuating the steering linkage comprises a linear actuator. So that conversion of the rotational movement of the electric motor by means of a gear into a translational movement can be omitted, a linear actuator is appropriate. The latter, because of its design, directly carries out a translational movement required for actuating the steering linkage. The linear actuator preferably has a solenoid. This design has the advantage over, for example, the moving coil design that higher actuating forces which are capable of reliably actuating the steering system can be obtained more simply. By means of the direct drive of the solenoid, generally higher actuating speeds and lower actuating times are obtained in comparison to geared drives.

A further preferred embodiment of the dual-circuit steering system according to the invention is characterized in that the respective electric motor has a rotor which is designed as a hollow shaft and is connected to a spindle nut of the drive unit for rotation therewith, which spindle nut is designed to drive a threaded spindle, which is incorporated by the drive unit, for actuating the steering linkage. This embodiment does not require any further gear between the electric motor and the threaded spindle of the steering gear. The rotor is connected fixedly to the spindle nut here and thus directly drives the threaded spindle. One advantage is that the motor is arranged in a substantially space-saving manner around the shaft.

The utility vehicle according to the invention is characterized in that it has an electromechanical dual-circuit steering system according to the invention.

Preferred refinements, features and advantages of the electromechanical dual-circuit steering system according to the invention also relate to the utility vehicle according to the invention, and vice versa.

The invention will be explained in more detail with reference to the following figures. These should be understood as merely by way of example and are not intended to restrict the invention to the exemplary embodiments which are shown.

DETAILED DESCRIPTION OF THE DRAWINGS

Figure 1:
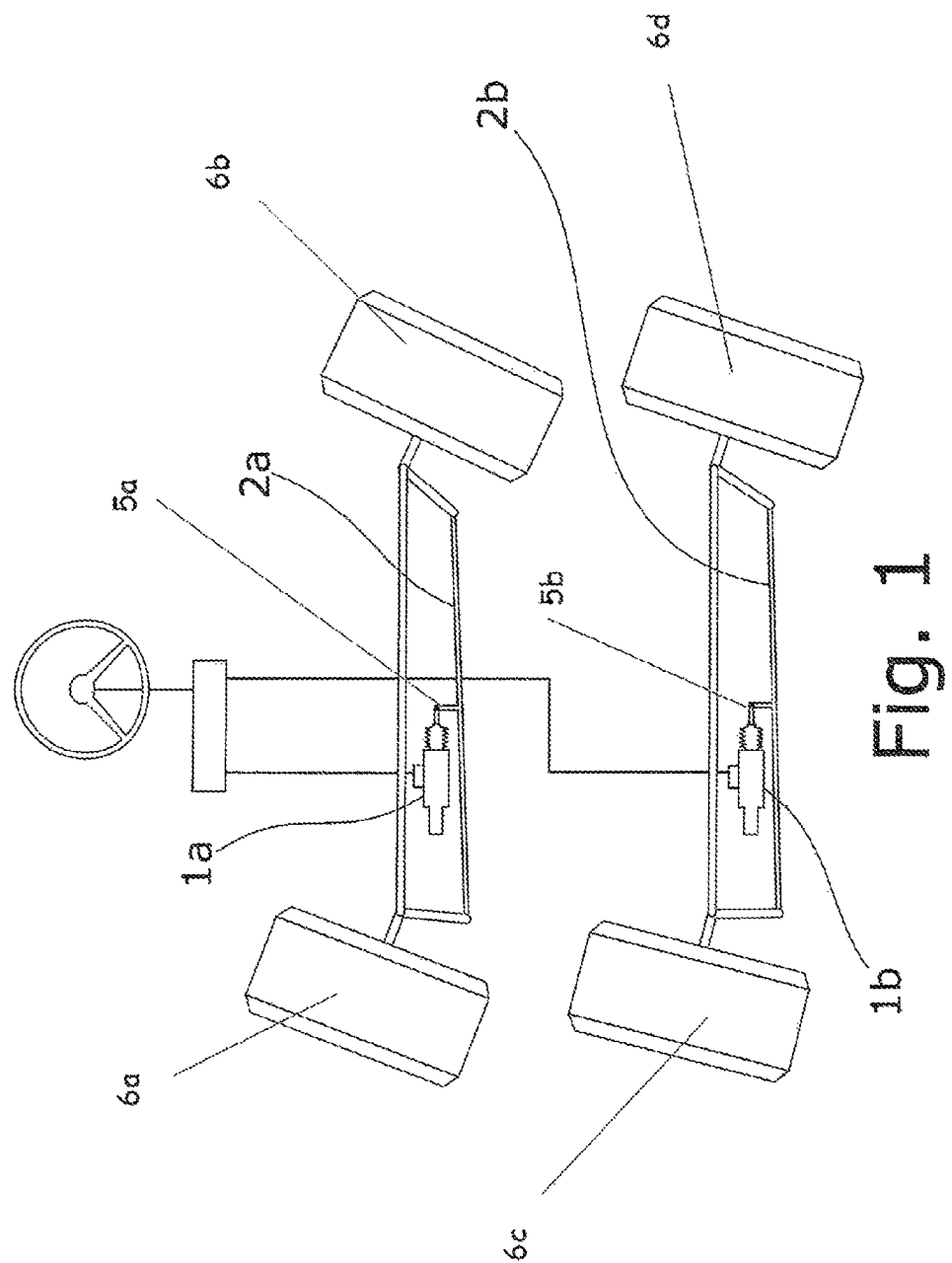
FIG. 1 is a schematic overview of an electromechanical dual-circuit steering system.

The illustration of FIG. 1 shows, in an overview, the basic design of an electromechanical dual-circuit steering system for utility vehicles. The dual-circuit steering system has two steering systems 1a, 1b, specifically especially a respective steering system 1a, 1b for the front steerable axle 2a and the rear steerable axle 2b of the utility vehicle. The direction-selecting element 3 of the utility vehicle, which is designed as a steering wheel and is connected here electrically in a manner not illustrated specifically here to the steering systems 1a, 1b, the steering linkages 5a, 5b, which connect the steering systems 1a, 1b to the respective steerable axle 2a, 2b, and the wheels 6a, 6b, 6c, 6d are likewise illustrated. This design applies to all of the exemplary embodiments described below. In this case, one individual steering system 1a, 1b in each case, but also the respective other steering system 1a, 1b are formed identically.

Figure 2:
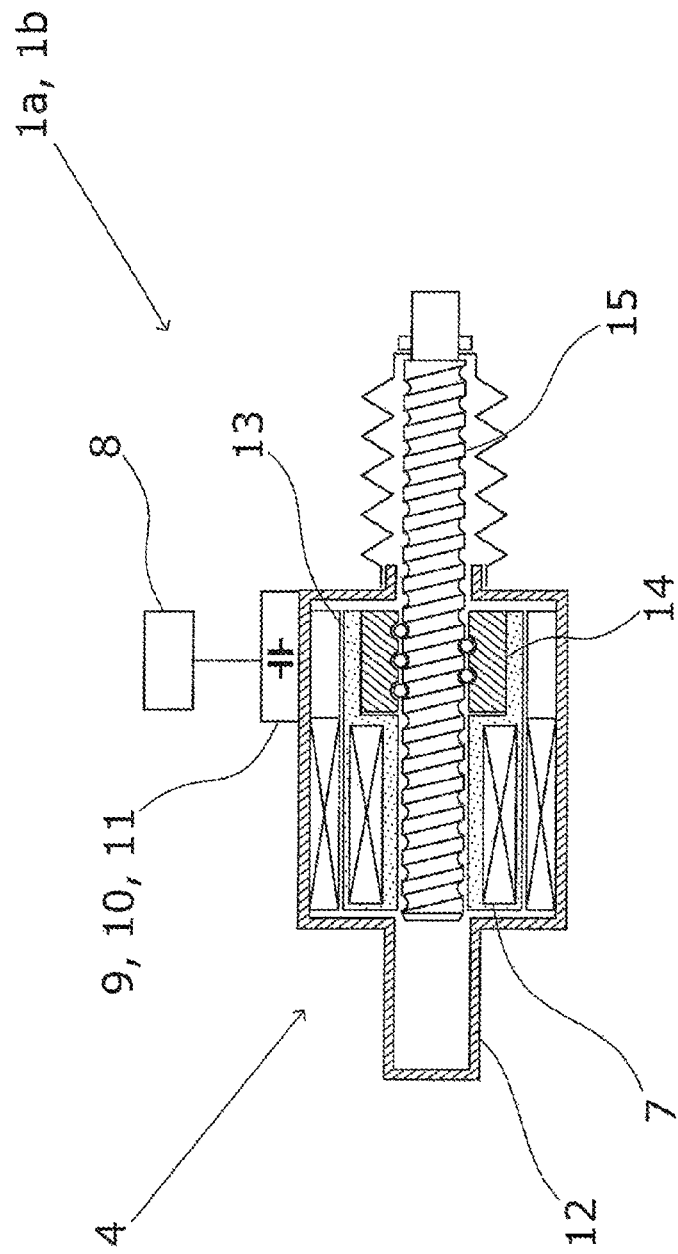
FIG. 2 is a sectional illustration of a steering system of a first exemplary embodiment of an electromechanical dual-circuit steering system according to the invention.

For the first exemplary embodiment of the electromechanical dual-circuit steering system, the steering system 1a with drive unit 4 is illustrated in FIG. 2, the drive unit 4 being arranged in a substantially closed steering housing 12 of the steering system 1a. The electric motor 7 of the drive unit 4 is supplied with electrical energy from the on-board network as the main power supply 8 during regular operation. In addition, the steering system 1a has an energy store 11, which is designed as a capacitor 10, of an emergency power supply 9 for the electric motor 7, which emergency power supply 9 supplies the electric motor 7 in the event of failure of the main power supply 8. The rotor 13 of the electric motor 7 is formed with the spindle nut 14 and the threaded spindle 15 in order to actuate the respective steering linkage 5a, 5b.

Figure 3:
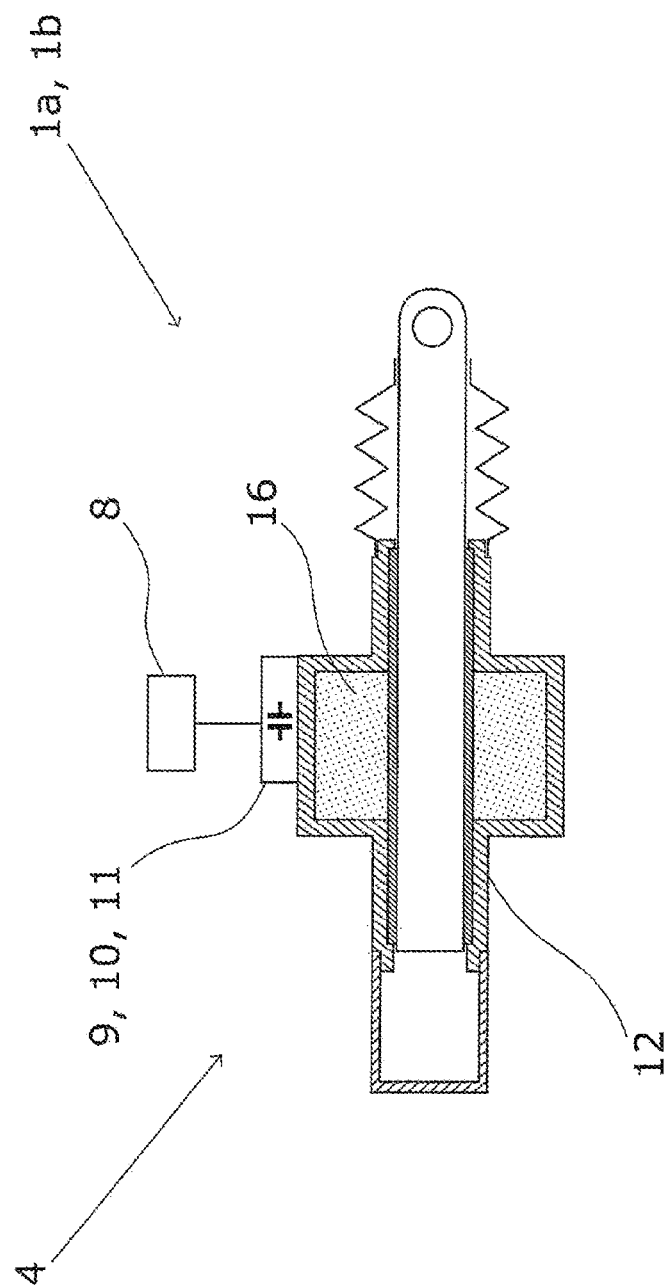
FIG. 3 is a sectional illustration of a steering system of a second exemplary embodiment of an electromechanical dual-circuit steering system according to the invention.

The steering system 1a with the drive unit 4 of the second exemplary embodiment is illustrated in FIG. 3. The second exemplary embodiment basically corresponds to the first exemplary embodiment, but the electric motor 7 here having a linear actuator 16, which is designed as a solenoid, for actuating the respective steering linkage 5a, 5b.

Figure 4:
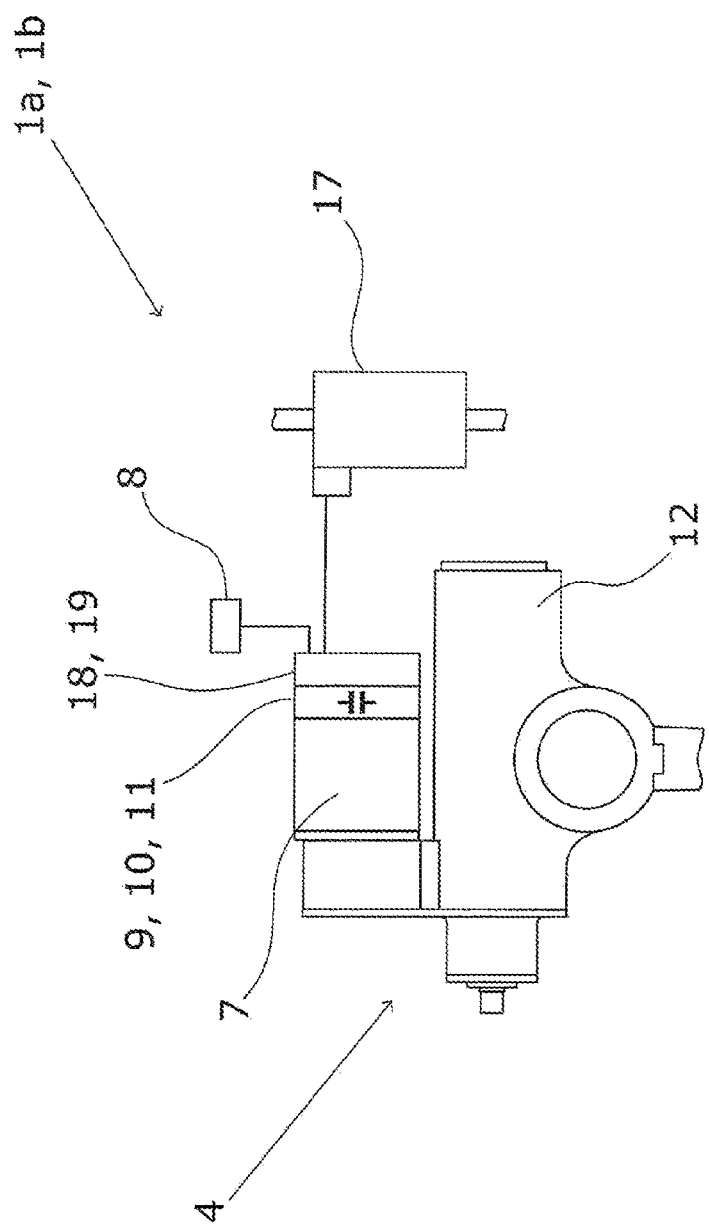
FIG. 4 is a top view of a steering system of a third exemplary embodiment of an electromechanical dual-circuit steering system according to the invention.

Finally, the steering system 1a with the drive unit 4 of the third exemplary embodiment is reproduced in FIG. 4. In this exemplary embodiment, the emergency power supply 9 has both an energy store 11, which is designed as a capacitor 10, and a generator 17, which is arranged outside the steering housing. The generator is driven depending on the driving, supplies the electric motor 7 and charges up the capacitor 10, which acts as an intermediate store. The capacitor 10 is thereby kept charged. This exemplary embodiment of the dual-circuit steering system furthermore has a motor control module 18 to which a desired steering angle which has been detected by a sensor on the direction-selecting element 3 is transmitted. The motor control module 18 then activates the electric motor 7 in accordance with the detected desired steering angle. A steer-by-wire functionality is thereby implemented. In addition, the motor control module 18 also forms a data interface 19 for an autonomous driving control system such that driverless operation of the utility vehicle is made possible.

The invention claimed is:

1. An electromechanical dual-circuit steering system for a utility vehicle, comprising:
   two steering systems, each comprising a drive unit for actuating a respective steering linkage for wheels of the utility vehicle, wherein each drive unit has a respective electric motor;
   a main power supply of the dual-circuit steering system for supplying the electric motors with energy; and
   at least one emergency power supply for supplying at least one of the electric motors with energy in an event of a failure of the main power supply, wherein the dual-circuit steering system comprises one substantially independent emergency power supply per electric motor.

2. The electromechanical dual-circuit steering system as claimed in claim 1, wherein
the respective substantially independent emergency power supply has a generator which is designed to be driven by rolling of the utility vehicle and to supply at least one of the electric motors with energy.

3. The electromechanical dual-circuit steering system as claimed in claim 1, wherein
the respective substantially independent emergency power supply has an energy store for supplying the electric motor.

4. The electromechanical dual-circuit steering system as claimed in claim 3, wherein
the energy store is a capacitor.

5. The electromechanical dual-circuit steering system as claimed in claim 3, wherein
the substantially independent emergency power supply is designed to charge up the energy store, in the event of a failure of the main power supply, by recuperation of restoring forces from the steering linkage.

6. The electromechanical dual-circuit steering system as claimed in claim 3, wherein
the energy store has a rechargeable battery.

7. The electromechanical dual-circuit steering system as claimed in claim 6, wherein
the rechargeable battery serves as an intermediate store for a generator for supplying the respective electric motor with energy.

8. The electromechanical dual-circuit steering system as claimed in claim 1, wherein
each steering system has a dedicated, substantially closed, steering housing, and
the respective substantially independent emergency power supply and the respective drive unit are arranged in the respective steering housing.

9. The electromechanical dual-circuit steering system as claimed in claim 8, wherein
an energy store of the respective substantially independent emergency power supply is arranged in the respective steering housing.

10. The electromechanical dual-circuit steering system as claimed in claim 9, wherein
a generator of the respective substantially independent emergency power supply is arranged outside the p steering housing.

11. The electromechanical dual-circuit steering system as claimed in claim 1, wherein
the dual-circuit steering system has the at least one emergency power supply for supplying all of the electric motors with energy in the event of a failure of the main power supply.

12. The electromechanical dual-circuit steering system as claimed in claim 1, wherein
a force for actuating the respective steering linkage originates solely from the respective electric motor.

13. The electromechanical dual-circuit steering system as claimed in claim 1, wherein
the dual-circuit steering system comprises a data interface for actuating the electric motor by an autonomous driving control system for driverless operation of the utility vehicle.

14. The electromechanical dual-circuit steering system as claimed in claim 1, wherein
the dual-circuit steering system has a sensor which is arranged on a direction-selecting element of the utility vehicle and which detects a desired steering angle and transmits same to a motor control module of the dual-circuit steering system, which and the motor control module, based on the detected desired steering angle, activates the respective electric motor.

15. The electromechanical dual-circuit steering system as claimed in claim 14, wherein
the motor control module compares the desired steering angle with an actual steering angle.

16. The electromechanical dual-circuit steering system as claimed in claim 1, wherein
the respective electric motor for actuating the steering linkage comprises a linear actuator.

17. The electromechanical dual-circuit steering system as claimed in claim 16, wherein
the linear actuator has a solenoid.

18. The electromechanical dual-circuit steering system as claimed in claim 1, wherein
the respective electric motor has a rotor which is designed as a hollow shaft and is connected to a spindle nut of the drive unit for rotation therewith, which spindle nut is designed to drive a threaded spindle, which is incorporated by the drive unit, for actuating the steering linkage.

19. A utility vehicle comprising an electromechanical dual-circuit steering system as claimed in claim 1.

* * * * *